US009510325B2

(12) United States Patent
Liu et al.

(10) Patent No.: US 9,510,325 B2
(45) Date of Patent: Nov. 29, 2016

(54) CHANNEL SELECTION METHOD AND APPARATUS

(71) Applicants: Huawei Technologies Co., Ltd., Shenzhen (CN); Beijing University of Posts And Telecommunications, Beijing (CN)

(72) Inventors: Pei Liu, Beijing (CN); Jin Shuai, Beijing (CN); Weixia Zou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/874,072

(22) Filed: Oct. 2, 2015

(65) Prior Publication Data

US 2016/0029347 A1 Jan. 28, 2016

Related U.S. Application Data

(63) Continuation of application No. PCT/CN2014/075075, filed on Apr. 10, 2014.

(30) Foreign Application Priority Data

Apr. 10, 2013 (CN) .......................... 2013 1 0123534

(51) Int. Cl.
*H04W 48/16* (2009.01)
*H04W 72/02* (2009.01)
(Continued)

(52) U.S. Cl.
CPC ............. *H04W 72/02* (2013.01); *H04W 24/08* (2013.01); *H04W 48/16* (2013.01); *H04W 72/0453* (2013.01); *H04W 72/1226* (2013.01); *H04W 84/18* (2013.01)

(58) Field of Classification Search
None
See application file for complete search history.

(56) References Cited

U.S. PATENT DOCUMENTS

2007/0274200 A1* 11/2007 Geile ..................... G06F 17/14
370/203
2008/0025202 A1* 1/2008 Geile ..................... G06F 17/14
370/211

(Continued)

FOREIGN PATENT DOCUMENTS

CN  101207540 A  6/2008
CN  101321127 A  12/2008

(Continued)

OTHER PUBLICATIONS

Hwang et al., "Adaptive Multi-Channel Utilization Scheme for Coexistence of IEEE802.15.4 LR-WPAN with Other Interfering Systems," 11$^{th}$ IEEE International Conference on High Performance Computing and Communications, Seoul, Korea, pp. 297-304, Institute of Electrical and Electronics Engineers, New York, New York (Jun. 25-27, 2009).

(Continued)

*Primary Examiner* — Diane Mizrahi
(74) *Attorney, Agent, or Firm* — Leydig, Voit & Mayer, Ltd.

(57) ABSTRACT

The present invention provides a channel selection method and an apparatus, relates to the field of communications, can improve channel scan and detection efficiency. The method includes: randomly selecting m channels from a preset channel page; determining, from the m channels, a working channel and a spare channel that meet a preset condition; scanning, the working channel of the first superframes and the spare channel of the first superframes in an inactive period of each of the n first superframes according to preset first scan duration, to acquire n energy levels of the working channel and n energy levels of the spare channel; and determining, in an inactive period of the $n^{th}$ first superframe, a working channel for sending a second superframe and a spare channel of the second superframe according to the n energy levels of the working channel and the n energy levels of the spare channel.

14 Claims, 6 Drawing Sheets

(51) Int. Cl.
*H04W 72/12* (2009.01)
*H04W 24/08* (2009.01)
*H04W 72/04* (2009.01)
*H04W 84/18* (2009.01)

(56) References Cited

U.S. PATENT DOCUMENTS

| | | |
|---|---|---|
| 2009/0086702 A1 | 4/2009 | Julian et al. |
| 2011/0261764 A1 | 10/2011 | Shirakata et al. |
| 2013/0084909 A1 | 4/2013 | Yoon |
| 2013/0195018 A1 | 8/2013 | Lv et al. |
| 2015/0030011 A1 | 1/2015 | Liu |

FOREIGN PATENT DOCUMENTS

| | | |
|---|---|---|
| CN | 101810038 A | 8/2010 |
| CN | 102457942 A | 5/2012 |
| CN | 102857327 A | 1/2013 |
| CN | 103228045 A | 7/2013 |
| EP | 2302975 A1 | 3/2011 |

OTHER PUBLICATIONS

Kim et al., "Multi-Dimensional Channel Management Scheme to Avoid Beacon Collision in LR-WPAN," IEEE Transactions on Consumer Electronics, vol. 54, No. 2, pp. 396-404, Institute of Electrical and Electronics Engineers, New York, New York, (May 2008).

IEEE Standard for Information technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (WPANs), IEEE Std 802.15.4-2006, pp. i-305, Institute of Electrical and Electronics Engineers, New York, New York (Sep. 8, 2006).

\* cited by examiner

CHANNEL SELECTION METHOD AND APPARATUS

CROSS-REFERENCE TO RELATED APPLICATIONS

This application is a continuation of International Patent Application No. PCT/CN2014/075075, filed on Apr. 10, 2014, which claims priority to Chinese Patent Application No. 201310123534.9, filed on Apr. 10, 2013, both of which are hereby incorporated by reference in their entireties.

STATEMENT OF JOINT RESEARCH AGREEMENT

The subject matter and the claimed invention were made by or on the behalf of Beijing University of Posts and Telecommunications, of Haidian District, Beijing, P.R. China, and Huawei Technologies Co., Ltd., of Shenzhen, Guangdong Province, P.R. China, under a joint research agreement titled "Research and Development of Key short-range wireless meter reading technology and standardization." The joint research agreement was in effect on or before the claimed invention was made, and that the claimed invention was made as a result of activities undertaken within the scope of the joint research agreement.

TECHNICAL FIELD

The present invention relates to the field of communications, and in particular, to a channel selection method and an apparatus.

BACKGROUND

Currently, a superframe structure defined in the China National Sensor Network Standard includes a beacon, an active period, and an inactive period, where the beacon is used to send synchronization information and superframe information; the active period is used to transmit data; and in the inactive period, a network device enters a sleep state, and does not transmit any data.

As a wireless sensor network technology develops, applications of a personal area network are diversified constantly. In an application scenario of the personal area network, such as an application scenario of wireless meter reading, because unpredictable complicated channel fading exists in time and space, a data communication process is seriously affected. Therefore, before communication is performed on the personal area network, it is particularly important for a coordinator in the personal area network to select a channel with relatively good quality for communication of the personal area network by scanning and detecting channels.

In the prior art, when a personal area network is built, a coordinator in the personal area network selects a channel with a minimum energy level from to-be-scanned channels that are specified by an upper layer, and broadcasts information about the channel in the personal area network by using a beacon, so that all nodes in the personal area network perform communication by using the channel, and the nodes in the personal area network keep performing communication by using the channel.

However, in the foregoing method of selecting a channel by the coordinator, on one hand, scan, detection, and evaluation can only be performed on a channel once, only quality of the channel in a short time can be evaluated, and quality of the channel in a long time cannot be ensured, and therefore, complicated and ever-changing channel fading in the personal area network cannot be dealt with; and on the other hand, there is no specific solution for the coordinator to select from the to-be-scanned channels, there is certain blindness, and if a to-be-scanned channel selected by the coordinator is located in a frequency band adjacent to an interfered frequency band, channel scan and detection efficiency is reduced.

SUMMARY

Embodiments of the present invention provide a channel selection method and an apparatus, on one hand, channels can be dynamically scanned, detected, and selected, to ensure that a selected working channel has relatively high communication quality; and on the other hand, the channels are divided and mapped in a uniform and discontinuous frequency band manner, to improve channel scan and detection efficiency.

To achieve the foregoing objectives, the following technical solutions are used in the embodiments of the present invention:

According to a first aspect, an embodiment of the present invention provides a channel selection method, including:

randomly selecting m channels from a preset channel page according to a preset algorithm, where $1 \leq m \leq 16$;

determining, from a channel queue consisting of the m channels, a working channel and a spare channel that meet a preset condition, where the channel queue is obtained by arranging the m channels according to channel numbers of the m channels, and the spare channel is a channel, in the channel queue, behind the working channel;

scanning, when n first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, where n is a positive integer; and determining, in an inactive period of the $n^{th}$ first superframe, a working channel for sending a second superframe and a spare channel of the second superframe according to the energy levels of the working channel of the n first superframes and the energy levels of the spare channel of the n first superframes.

In a first possible implementation manner of the first aspect, a method of the determining, from a channel queue consisting of the m channels, a working channel and a spare channel that meet a preset condition specifically includes:

successively scanning the m channels according to the channel queue and according to preset second scan duration, and saving an energy level of a scanned channel; and if an energy level of the $x^{th}$ channel is less than a preset energy threshold, determining that the $x^{th}$ channel is the working channel, and that the $(x+1)^{th}$ channel is the spare channel, where $1 \leq x \leq m$.

With reference to the foregoing first aspect or the first possible implementation manner of the first aspect, in a second possible implementation manner, before the scanning, when n first superframes are sent through the working channel, the working channel of the first superframes and the spare channel of the first superframes in an inactive period of each of the n first superframes according to preset first scan duration, the method further includes:

determining, according to duration of the inactive period of the first superframe, that both duration for scanning the working channel of the first superframe and duration for scanning the spare channel of the first superframe are the first scan duration.

With reference to the foregoing first aspect or any implementation manner of the first possible implementation manner to the second possible implementation manner of the first aspect, in a third possible implementation manner, a method of the determining a working channel for sending a second superframe and a spare channel of the second superframe according to the energy levels of the working channel of the n first superframes and the energy levels of the spare channel of the n first superframes specifically includes:

separately averaging the energy levels of the working channel of the n first superframes and the energy levels of the spare channel of the n first superframes, to acquire an averaged energy level of the working channel of the n first superframes and an averaged energy level of the spare channel of the n first superframes;

comparing the averaged energy level of the working channel of the n first superframes with the averaged energy level of the spare channel of the n first superframes; and if the averaged energy level of the spare channel of the n first superframes is greater than the averaged energy level of the working channel of the n first superframes, determining that the working channel of the first superframes is the working channel for sending the second superframe, and determining that a channel, in the channel queue, behind the spare channel of the first superframes is the spare channel of the second superframe; or if the averaged energy level of the spare channel of the n first superframes is less than the averaged energy level of the working channel of the n first superframes, determining that the spare channel of the first superframes is the working channel for sending the second superframe, and determining that a channel, in the channel queue, behind the spare channel of the first superframes is the spare channel of the second superframe.

With reference to the foregoing first aspect or any implementation manner of the first possible implementation manner to the third possible implementation manner of the first aspect, in a fourth possible implementation manner, the method further includes:

after the m channels are scanned, re-arranging the m channels according to energy levels of the m channels, to update the channel queue.

With reference to the fourth possible implementation manner of the first aspect, in a fifth possible implementation manner, that the m channels are scanned specifically includes:

successively scanning the m channels according to the second scan duration and the channel queue and according to the channel numbers of the m channels, or successively scanning the m channels according to the first scan duration and the channel queue and according to the energy levels of the m channels.

With reference to the foregoing first aspect or any implementation manner of the first possible implementation manner to the fifth possible implementation manner of the first aspect, in a sixth possible implementation manner, circularly executing the channel selection method.

According to a second aspect, an embodiment of the present invention provides a coordinator, including:

a selecting unit, configured to randomly select m channels from a preset channel page, where $1 \leq m \leq 16$;

a determining unit, configured to determine, from a channel queue consisting of the m channels, a working channel and a spare channel that meet a preset condition, where the channel queue is obtained by arranging the m channels according to channel numbers of the m channels, and the spare channel is a channel, in the channel queue, behind the working channel; and a processing unit, configured to scan, when n first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, where n is a positive integer, where the determining unit is configured to determine, in an inactive period of the $n^{th}$ first superframe, a working channel for sending a second superframe and a spare channel of the second superframe according to the energy levels of the working channel of the n first superframes and the energy levels of the spare channel of the n first superframes.

In a first possible implementation manner of the second aspect, the processing unit is specifically configured to successively scan the m channels according to the channel queue and according to preset second scan duration, and save an energy level of a scanned channel; and the determining unit is specifically configured to: if an energy level of the $x^{th}$ channel is less than a preset energy threshold, determine that the $x^{th}$ channel is the working channel, and that the $(x+1)^{th}$ channel is the spare channel, where $1 \leq x \leq m$.

With reference to the foregoing second aspect or the first possible implementation manner of the second aspect, in a second possible implementation manner, the determining unit is specifically configured to determine, according to duration of the inactive period of the first superframe, that both duration for scanning the working channel of the first superframe and duration for scanning the spare channel of the first superframe are the first scan duration.

With reference to the foregoing second aspect or any implementation manner of the first possible implementation manner to the second possible implementation manner of the second aspect, in a third possible implementation manner, the processing unit is specifically configured to separately average the energy levels of the working channel of the n first superframes and the energy levels of the spare channel of the n first superframes, to acquire an averaged energy level of the working channel of the n first superframes and an averaged energy level of the spare channel of the n first superframes; and compare the averaged energy level of the working channel of the n first superframes with the averaged energy level of the spare channel of the n first superframes; and the determining unit is specifically configured to: if the averaged energy level of the spare channel of the n first superframes is greater than the averaged energy level of the working channel of the n first superframes, determine that the working channel of the first superframes is the working channel for sending the second superframe, and determine that a channel, in the channel queue, behind the spare channel of the first superframes is the spare channel of the second superframe, or if the averaged energy level of the spare channel of the n first superframes is less than the averaged energy level of the working channel of the n first superframes, determine that the spare channel of the first superframes is the working channel for sending the second superframe, and determine that a channel, in the channel queue, behind the spare channel of the first superframes is the spare channel of the second superframe.

With reference to the foregoing second aspect or any implementation manner of the first possible implementation manner to the third possible implementation manner of the second aspect, in a fourth possible implementation manner, the processing unit is further configured to: after the m channels are scanned, re-arrange the m channels according to energy levels of the m channels, to update the channel queue.

With reference to the fourth possible implementation manner of the second aspect, in a fifth possible implementation manner, the processing unit is specifically configured to successively scan the m channels according to the second scan duration and the channel queue and according to the channel numbers of the m channels, or successively scan the m channels according to the first scan duration and the channel queue and according to the energy levels of the m channels.

Embodiments of the present invention provide a channel selection method and an apparatus. On one hand, because each time n first superframes are sent, a coordinator can scan a working channel and a spare channel that are selected from m channels, and select a suitable working channel of a second superframe and a spare channel of the second superframe after the channels are scanned, until a process of successively scanning the m channels in a channel queue is finished, that is, dynamic scan, detection, and selection on the channels in a rotation sliding window manner are implemented, thereby ensuring that a selected working channel has relatively high communication quality; and on the other hand, because the m channels randomly selected by the coordinator from a preset channel page are channels that are divided and mapped in a uniform and discontinuous frequency band manner, the coordinator can scan these channels to improve channel scan and detection efficiency.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the prior art, for a star network in a personal area network, when the network is built, a coordinator needs to scan several channels, to determine a working channel, that is, a communications channel, of the star network. First, an upper layer of the coordinator generates a channel scan request primitive, where the primitive includes channel scan related parameters such as a scan type, a to-be-scanned channel, a to-be-scanned channel page and single channel scan duration. Then, the coordinator successively scans the channels according to the primitive in an ascending order of channel numbers of specified to-be-scanned channels, saves a maximum energy detection measure of each channel at the same time, and converts the maximum energy detection measure into a corresponding energy level. After finishing scanning the to-be-scanned channels, the coordinator reports a scan result of scanned channels by using a channel scan confirm primitive, where the primitive includes parameters such as a scan request state and an energy detection list (that is, energy levels of the scanned channels). Finally, the coordinator selects a channel with a minimum energy level from the scanned channels as the communications channel, and broadcasts information about the channel to the entire network, to enter normal communication. After this, the communications channel keeps serving as the communications channel of the network in which the coordinator is located.

Embodiment 1

Figure 1:
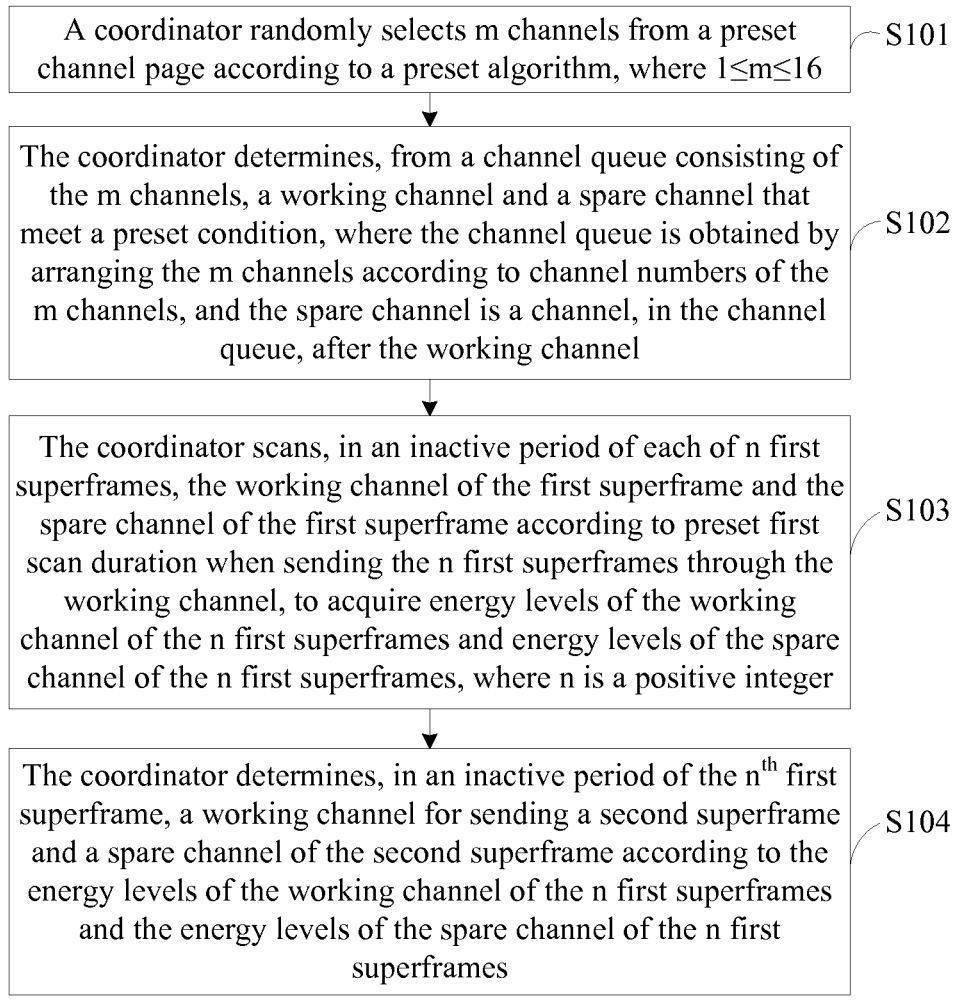
FIG. 1 is a flowchart 1 of a channel selection method according to an embodiment of the present invention.

This embodiment of the present invention provides a channel selection method. As shown in FIG. 1, the method includes:

S101: A coordinator randomly selects m channels from a preset channel page according to a preset algorithm, where 1≤m≤16.

Figure 2:
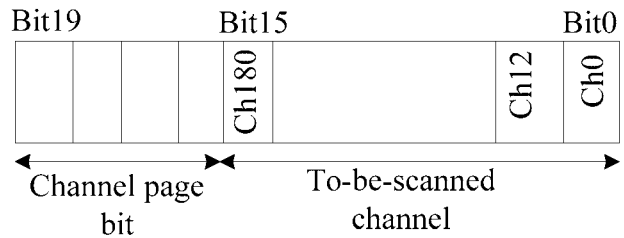
FIG. 2 is a schematic diagram of a representation manner of a channel according to an embodiment of the present invention.

The China National Sensor Network Standard includes 16 channel pages, and each channel page may accommodate 16 channels. A device in a personal area network may specify a channel page and channel numbers of to-be-scanned channels in a manner shown in FIG. 2, where Bit0 to Bit15 correspond to the 16 channels on each channel page, if a Bit value is 1, it indicates that the channel is to be scanned, and if a Bit value is 0, it indicates that the channel is not to be scanned; and Bit16 to Bit19 are channel page bits, and are used in a combined manner to indicate the 16 channel pages.

In this embodiment of the present invention, a frequency band of 470 MHz to 510 MHz in the China National Sensor Network Standard is used as an example, and a channel bandwidth of 200 KHz is used. Therefore, the frequency band may be divided into 200 channels, and the 200 channels are successively numbered as 0 to 199 in an ascending order of channel frequencies. If these channels are arranged and mapped in a manner shown in Table 1, channels on each channel page are distributed in a uniformly spaced manner (except a channel page 12).

TABLE 1

| Channel Page (Channel Page) | Channel Number (Channel Number) | | | | |
|---|---|---|---|---|---|
| Bit 19 to Bit 16 | Bit 15 | Bit 14 | Bit 13 | ... | Bit 0 |
| 0 | 0 | 12 | 24 | ... | 180 |
| 1 | 1 | 13 | 25 | ... | 181 |
| 2 | 2 | 14 | 26 | ... | 182 |
| 3 | 3 | 15 | 27 | ... | 183 |
| 4 | 4 | 16 | 28 | ... | 184 |
| 5 | 5 | 17 | 29 | ... | 185 |
| 6 | 6 | 18 | 30 | ... | 186 |
| 7 | 7 | 19 | 31 | ... | 187 |
| 8 | 8 | 20 | 32 | ... | 188 |
| 9 | 9 | 21 | 33 | ... | 189 |
| 10 | 10 | 22 | 34 | ... | 190 |
| 11 | 11 | 23 | 35 | ... | 191 |
| 12 | 192 193 194 195 196 197 198 199 | | | | |
| 13 | Reserved | | | | |
| 14 | | | | | |
| 15 | | | | | |

Specifically, the coordinator selects a channel page from Table 1 according to Formula (1), and randomly acquires m channels from the channel page according to the following channel number acquisition algorithm, where $1 \leq m \leq 16$.

$$\text{PageNum} = \text{PANID} \bmod 16 \quad (1).$$

It should be noted that, PageNum is a channel page, and PANID is a network ID number of a network in which the coordinator is located. Particularly, after the network is re-built, a network ID number is randomly generated. Because the network ID number is generally unchanged, the channel page selected by the coordinator is determined when the network ID number is determined.

The channel number acquisition algorithm provided in this embodiment of the present invention is as follows:

```
a=randi(16,1,m);
for i=1:m
ChannelNum=ChannelTable(PageNum).ChannelNum(a(i));
end;
``` where the statement of "a=randi(16,1,m);" indicates that m random channel index numbers are obtained from 16 channels of a channel page, and the m channel index numbers are stored in a, so that m channel numbers on a corresponding channel page are obtained by looking up Table 1.

S102: The coordinator determines, from a channel queue consisting of the m channels, a working channel and a spare channel that meet a preset condition, where the channel queue is obtained by arranging the m channels according to channel numbers of the m channels, and the spare channel is a channel, in the channel queue, behind the working channel.

When the personal area network is built, after the coordinator acquires the m channels, first, the m channels are arranged successively according to the channel numbers, to obtain the corresponding channel queue. Then, the coordinator successively scans the m channels in the channel queue according to the channel numbers, so as to determine, from the channel queue, the working channel and the spare channel that meet the preset condition, where the spare channel is the channel, in the channel queue, behind the working channel.

The China National Sensor Network Standard defines 15 levels of single channel scan duration, and a calculation formula is shown in Formula (2). The device in the personal area network may specify any level of the single channel scan duration to scan designated specified channel.

$$\text{ScanDuration} = \text{aBaseSuperframeDuration} * (2^n + 1) \quad (2),$$

where an effective range of n is 0 to 14, corresponding to a frequency band of 470 MHz to 510 MHz, a transmission rate of 25 kbps, and a single channel scan duration range of 0.3072 s to 2.516736 s, if it is assumed that T=aBaseSuperframeDuration, a mapping between n and the single channel scan duration is shown in Table 2:

TABLE 2

| | n | | | | | | | | | | | | | |
|---|---|---|---|---|---|---|---|---|---|---|---|---|---|---|
| | 0 | 1 | 2 | 3 | 5 | 6 | 7 | 8 | 9 | 10 | 11 | 12 | 13 | 14 |
| ScanDuration | T | 3T | 5T | 9T | 33T | 65T | 129T | 257T | 513T | 1025T | 4097T | 8193T | 8193T | 16387T |

It should be noted that, Formula (2) is not met when n=0, because it is specified in the China National Sensor Network Standard that the single channel scan duration is defined as T when n=0.

In addition, the China National Sensor Network Standard further defines various channel scan manners, including channel energy detection scan, active channel scan, passive channel scan, and orphan device channel scan. All devices in the personal area network can perform the passive scan and orphan scan on the specified channels, and the coordinator can further perform the channel energy detection scan and active channel scan on the specified channels. When performing the channel energy detection scan on the specified channels, the coordinator may obtain a maximum energy detection measure, that is, an energy peak value, of each scanned channel, and may convert the energy peak value into a corresponding energy level, so that the coordinator stores the energy level, to return the energy level to an upper layer by using a channel scan confirm primitive.

The China National Sensor Network Standard defines three idle channel evaluation manners, which separately are energy detection, carrier sense, and energy detection plus carrier sense. The energy detection is that, after an energy level of a channel is obtained by detection, the detected energy level of the channel is compared with an energy threshold, and if the detected energy level of the channel is greater than the energy threshold, it is considered that the channel is busy, or if the detected energy level of the channel is less than the energy threshold, it is considered that the channel is idle.

Figure 3:
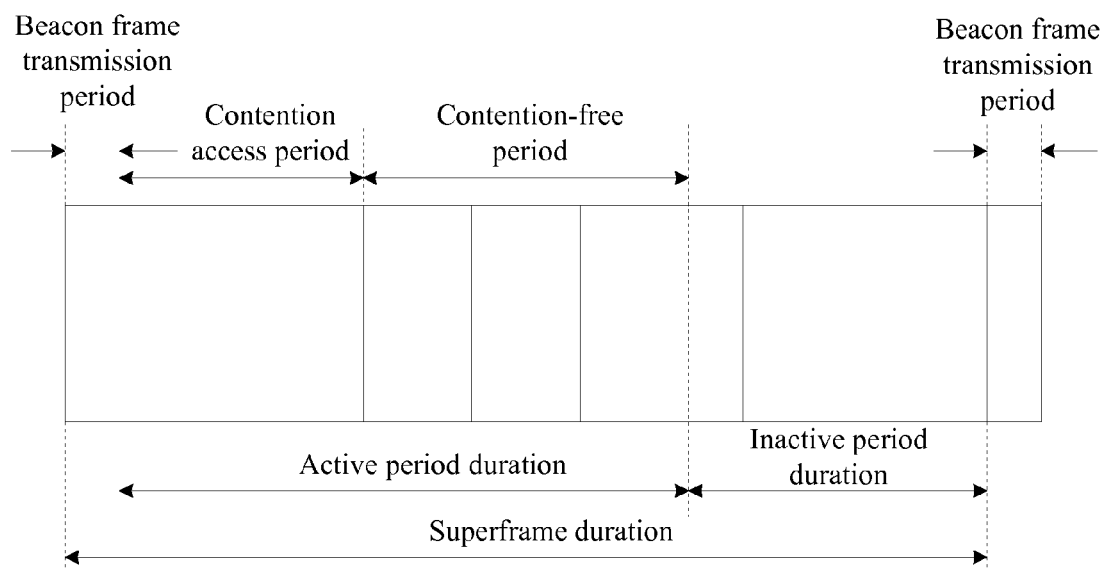
FIG. 3 is a schematic structural diagram of a superframe according to an embodiment of the present invention.

A superframe structure shown in FIG. 3 is used in the China National Sensor Network Standard, and the superframe structure includes a beacon frame transmission period, an active period, and an inactive period. The active period is divided into two phases, which separately are a contention access period and a contention-free period. In the beacon frame transmission period of the superframe structure, the coordinator broadcasts synchronization and superframe parameters to the entire network; in the contention access period, devices in the network access a channel by using a CSMA-CA algorithm; in the contention-free period, each device in the network sends data according to an allocated fixed timeslot; and in the inactive period, all devices in the network enter a sleep state, and do not transmit any data.

In the superframe structure, if a superframe duration is:

BI= aBaseSuperframeDuration*$2^{BO}$ symbols; and
an active period duration is:
SD= aBaseSuperframeDuration*$2^{SO}$ symbols;
an inactive period duration is:
IP= aBaseSuperframeDuration*($2^{BO}$ - $2^{SO}$) symbols;

where in a personal area network that uses the superframe structure, $0 \leq SO \leq BO \leq 14$, and aBaseSuperframeDuration=960 symbols.

It should be noted that, the foregoing preset condition met by the working channel may be that, if an energy level of a channel in the channel queue is less than the energy threshold, the channel may be used as the working channel; and correspondingly, a channel, in the channel queue, behind the working channel is the spare channel that meets the preset condition. For example, according to Table 1, if a channel number of a selected working channel that meets the preset condition is 12, a channel, in the channel queue, behind the working channel, that is, a channel with a channel number of 24 is the spare channel that meets the preset condition.

S103: The coordinator scans, when n first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, where n is a positive integer.

After the personal area network enters normal communication, when sending the n first superframes through the working channel, the coordinator scans the working channel of the first superframes and the spare channel of the first superframes in the inactive period of each of the first superframes according to the preset first scan duration, and acquires the energy levels of the working channel of the n first superframes and the energy levels of the spare channel of the n first superframes.

It should be noted that, the coordinator scans the channels in an inactive period of a first superframe to evaluate channel quality of the scanned channels more accurately. Because in the inactive period of the first superframe, all the devices in the personal area network are in sleep state and do not transmit any data, external interference imposed on the channels is minimum in this case, that is, the channel quality evaluated in this case in the most accurate.

According to the 15 levels of the single channel scan duration shown in Table 2, n is a positive integer corresponding to single channel scan duration in Table 2. Specifically, for example, if the preset first scan duration is T, the value of n may be 1, 3, 5, 9, 17, 33, 65, 129, 257, 513, 1025, 2049, 4097, 8193 or 16387; if the preset first scan duration is 3T, the value of n may be 1, 3, 11, 43, 171, 683 or 2731; and if the preset first scan duration is 5T, the value of n may be 1, 13 or 205.

S104: The coordinator determines, in an inactive period of the $n^{th}$ first superframe, a working channel for sending a second superframe and a spare channel of the second superframe according to the energy levels of the working channel of the n first superframes and the energy levels of the spare channel of the n first superframes.

After finishing scanning the working channel and the spare channel, the coordinator determines, in the inactive period of the $n^{th}$ first superframe, the working channel for sending the second superframe and the spare channel of the second superframe according to the acquired energy levels of the working channel of the n first superframes and energy levels of the spare channel of the n first superframes.

It should be noted that, the coordinator needs to scan, in the inactive period of each first superframe of the n first superframes, the working channel of the first superframes and the spare channel of the first superframes once, and the coordinator only needs to determine, in the inactive period of the $n^{th}$ first superframe, the working channel for sending the second superframe and the spare channel of the second superframe. For example, if the value of n is 1, the coordinator scans, in an inactive period of one first superframe, the working channel of the one first superframe and the spare channel of the one first superframe once, and determines, in the inactive period of the one first superframe, a working channel for sending the second superframe and a spare channel of the second superframe; and if the value of n is 3, the coordinator scans, in an inactive period of each first superframe of 3 first superframes, the working channel of the first superframes and the spare channel of the first superframes once, and determines, in an inactive period of the $3^{rd}$ first superframe, a working channel for sending the second superframe and a spare channel of the second superframe.

Further, the determining, by the coordinator in an inactive period of the $n^{th}$ first superframe, a working channel for sending a second superframe and a spare channel of the second superframe may be understood as that: if the value of n is 1, the coordinator can determine, in an inactive period of the one first superframe, a working channel of a next superframe of the first superframe and a spare channel of the next superframe; and if the value of n is 3, the coordinator can determine, in an inactive period of the $3^{rd}$ first superframe, a working channel of next 3 superframes of the $3^{rd}$ first superframe and a spare channel of the next 3 superframes.

The process is executed in this manner, until the coordinator finishes scanning all the m channels in the channel queue. In this case, the coordinator re-arranges the m channels according to the saved energy levels of the scanned channels, to update the previous channel queue, that is, to obtain a new channel queue. The coordinator performs a new round of scan and selection on the channels in the new channel queue again according to a corresponding preset rule and the foregoing channel selection method, and a corresponding channel scanning process is described in detail in a subsequent embodiment.

This embodiment of the present invention provides a channel selection method. On one hand, because each time n first superframes are sent, a working channel and a spare channel that are selected from m channels can be scanned, and a suitable working channel of a second superframe and a spare channel of the second superframe are selected after the channels are scanned, until a process of successively scanning the m channels in a channel queue is finished, that is, dynamic scan, detection, and selection on the channels in a rotation sliding window manner are implemented, thereby ensuring that a selected working channel has relatively high communication quality; and on the other hand, because the m channels randomly selected from a preset channel page are channels that are divided and mapped in a uniform and discontinuous frequency band manner, channel scan and detection efficiency can be improved by scanning these channels.

Embodiment 2

Figure 4A:
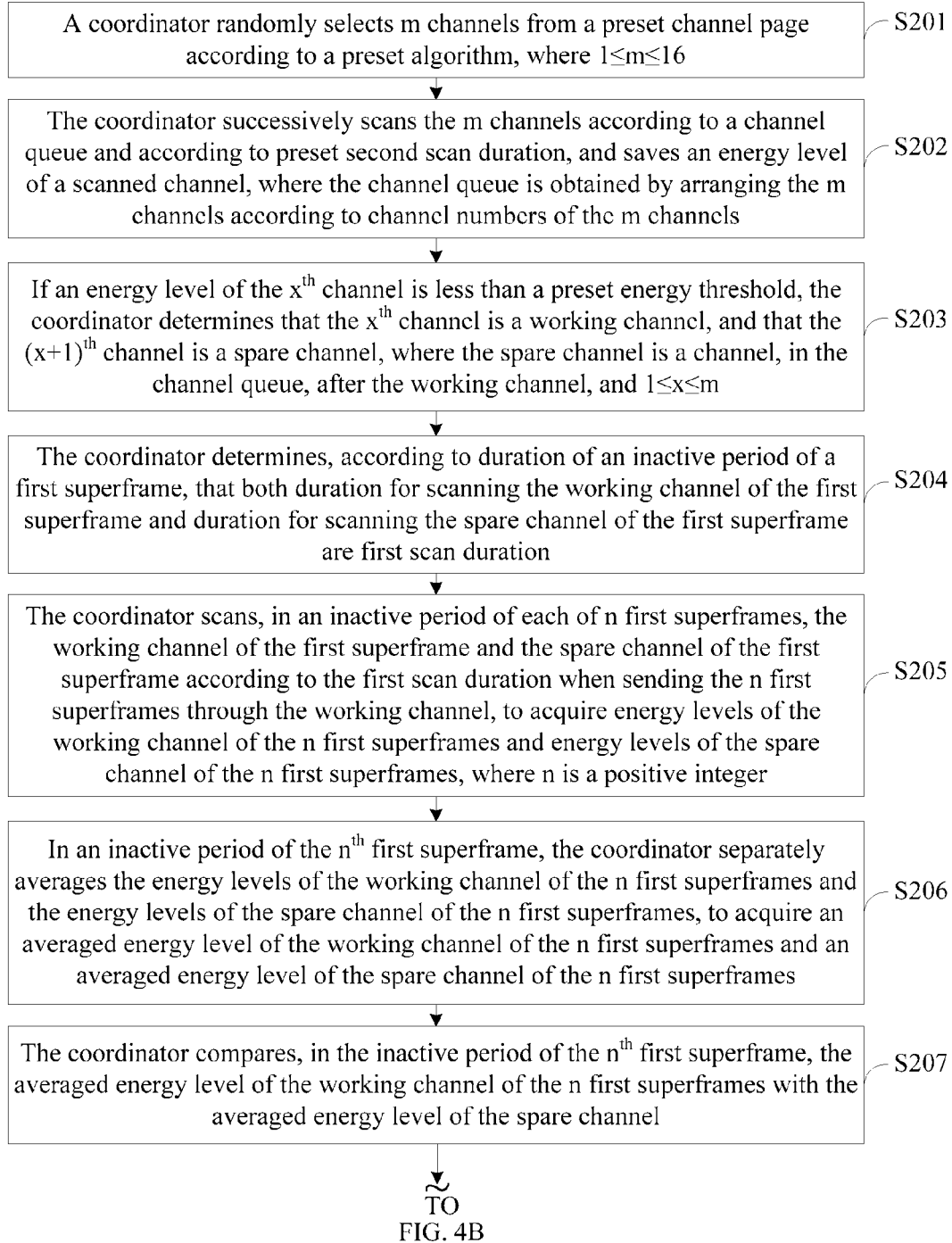
FIG. 4A and FIG. 4B are a flowchart 2 of a channel selection method according to an embodiment of the present invention.
Figure 4B:
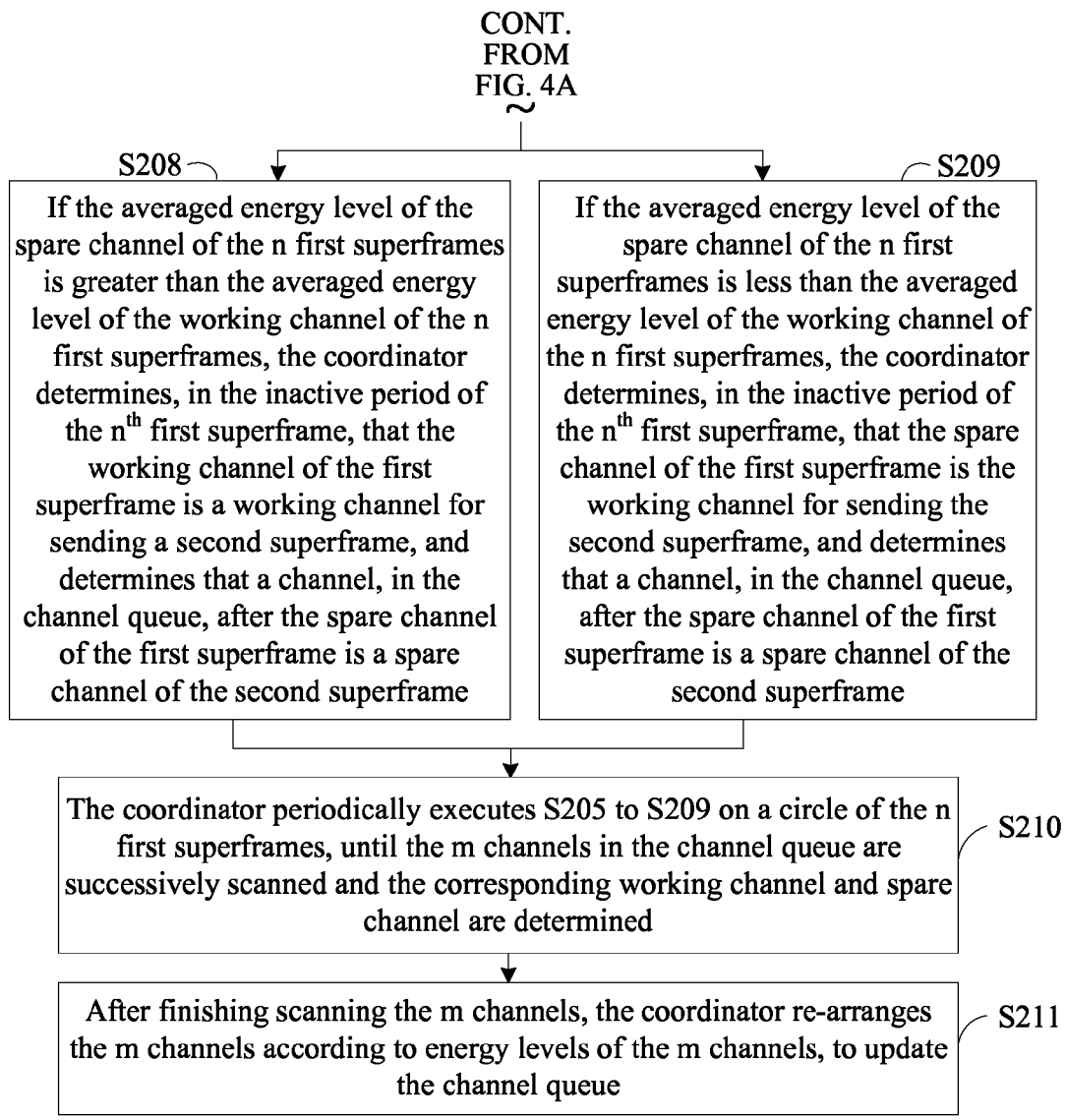

This embodiment of the present invention provides a channel selection method. As shown in FIG. 4A and FIG. 4B, the method includes:

S201: A coordinator randomly selects m channels from a preset channel page according to a preset algorithm, where $1 \leq m \leq 16$.

The China National Sensor Network Standard includes 16 channel pages, and each channel page may accommodate 16 channels. A device in a personal area network may specify a channel page and channel numbers of to-be-scanned channels in a manner shown in FIG. 2, where Bit0 to Bit15 correspond to the 16 channels on each channel page, if a Bit value is 1, it indicates that the channel is to be scanned, and if a Bit value is 0, it indicates that the channel is not to be scanned; and Bit16 to Bit19 are channel page bits, and are used in a combined manner to indicate the 16 channel pages.

In this embodiment of the present invention, a frequency band of 470 MHz to 510 MHz in the China National Sensor Network Standard is used as an example, and a channel bandwidth of 200 KHz is used. Therefore, the frequency band may be divided into 200 channels, and the 200 channels are successively numbered as 0 to 199 in an ascending order of channel frequencies. If these channels are arranged and mapped in a manner shown in Table 1, channels on each channel page are distributed in a uniformly spaced manner (except a channel page 12).

Specifically, the coordinator selects a channel page from Table 1 according to Formula (1), and randomly acquires m channels from the channel page according to the following channel number acquisition algorithm, where $1 \leq m \leq 16$.

The channel number acquisition algorithm provided in this embodiment of the present invention is as follows:

```
a=randi(16,1,m);
for i=1:m
ChannelNum=ChannelTable(PageNum).ChannelNum(a(i));
end;
``` where the statement of "a=randi(16,1,m);" indicates that m random channel index numbers are obtained from 16 channels of a channel page, and the m channel index numbers are stored in a, so that m channel numbers on a corresponding channel page are obtained by looking up Table 1.

S202: The coordinator successively scans the m channels according to a channel queue and according to preset second scan duration, and saves an energy level of a scanned channel, where the channel queue is obtained by arranging the m channels according to channel numbers of the m channels.

The China National Sensor Network Standard further defines 15 levels of single channel scan duration, and a calculation formula is shown in Formula (2). The device in the personal area network may specify any level of the single channel scan duration to scan specified channels.

In addition, the China National Sensor Network Standard further defines various channel scan manners, including channel energy detection scan, active channel scan, passive channel scan, and orphan device channel scan. All devices in the personal area network can perform the passive scan and orphan scan on the specified channels, and the coordinator can further perform the channel energy detection scan and active channel scan on the specified channels. When performing the channel energy detection scan on the specified channels, the coordinator may obtain a maximum energy detection measure, that is, an energy peak value, of each scanned channel, and may convert the energy peak value into a corresponding energy level, so that the coordinator stores the energy level, to return the energy level to an upper layer by using a channel scan confirm primitive.

The China National Sensor Network Standard defines three idle channel evaluation manners, which separately are energy detection, carrier sense, and energy detection plus carrier sense. The energy detection is that, after an energy level of a channel is obtained by detection, the detected energy level of the channel is compared with an energy threshold, and if the detected energy level of the channel is greater than the energy threshold, it is considered that the channel is busy, or if the detected energy level of the channel is less than the energy threshold, it is considered that the channel is idle.

A superframe structure shown in FIG. 3 is used in the China National Sensor Network Standard, and the superframe structure includes a beacon frame transmission period, an active period, and an inactive period. The active period is divided into two phases, which separately are a contention access period and a contention-free period. In the beacon frame transmission period of the superframe structure, the coordinator broadcasts synchronization and superframe parameters to the entire network; in the contention access period, devices in the network compete for a channel by using a CSMA-CA algorithm; in the contention-free period, each device in the network sends data according to an allocated fixed timeslot; and in the inactive period, all devices in the network enter a sleep state, and do not transmit any data.

Exemplarily, when the personal area network is built, after the coordinator acquires the m channels, first, the m channels are arranged successively according to the channel numbers, to obtain the corresponding channel queue. Then, the coordinator successively scans the m channels in the channel queue according to the preset second scan duration, and saves the energy level of the scanned channel.

It should be noted that, when the personal area network is built, in order to fast finish a channel scan and selection process, to enable the network to fast enter a communications phase, the second scan duration may be minimum duration T of the single channel scan duration shown in Table 2.

S203: If an energy level of the $x^{th}$ channel is less than a preset energy threshold, the coordinator determines that the $x^{th}$ channel is a working channel, and that the $(x+1)^{th}$ channel is a spare channel, where the spare channel is a channel, in the channel queue, behind the working channel, and $1 \leq x \leq m$.

In a process that the coordinator successively scans the m channels in the channel queue according to the channel numbers, if the energy level of the $x^{th}$ channel is less than the preset energy threshold, the coordinator determines that the $X^{th}$ channel is the working channel, and that the $(x+1)^{th}$ channel is the spare channel, where the spare channel is the channel, in the channel queue, behind the working channel, and $1 \leq x \leq m$.

According to Table 1, if a selected working channel is the $x^{th}$ channel, and a channel number of the working channel is 12, a selected spare channel is the $(x+1)^{th}$ channel, and a channel number of the spare channel is 24.

S204: The coordinator determines, according to duration of an inactive period of a first superframe, that both duration for scanning the working channel of the first superframe and duration for scanning the spare channel of the first superframe are first scan duration.

According to the duration of the inactive period of the first superframe, the coordinator may first determine that both duration for scanning the working channel of the first superframe and duration for scanning the spare channel of the first superframe are the first scan duration. Next, the coordinator then scans the working channel of the first superframe and the spare channel of the first superframe according to the first scan duration. In principle, the duration for the coordinator to scan the working channel of the first superframe and the spare channel of the first superframe are equal. Further, for determined duration of the inactive period, greatest possible scan duration should be used to scan the working channel of the first superframe and the spare channel of the first superframe. That is, the first scan duration may be maximum scan duration of scan duration that is determined by the coordinator according to the duration of the inactive period of the first superframe.

Specifically, the coordinator may calculate, according to Formula (3) for calculating scan duration, the first scan duration for scanning the working channel and the spare channel.

$$aBaseSuperframeDuration*(2^n+1) \leq IP/2 \qquad (3),$$

where IP is the duration of the inactive period.

For example, if the duration of the inactive period is 7*aBaseSuperframeDuration, a value of n may be 1. Referring to Table 2, it may be learned that the first scan duration for scanning the working channel and the spare channel is 3T.

S205: The coordinator scans, when n first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, where n is a positive integer.

After the personal area network enters normal communication, when sending the n first superframes through the working channel, the coordinator scans the working channel of the first superframes and the spare channel of the first superframes in the inactive period of each of the first superframes according to the foregoing first scan duration obtained by calculation, and acquires the energy levels of the working channel of the n first superframes and the energy levels of the spare channel of the n first superframes.

It should be noted that, the coordinator scans the channels in the inactive period of each first superframe to evaluate channel quality of the scanned channels more accurately. Because in the inactive period of each superframe, all the devices in the personal area network are in sleep state and do not transmit any data, external interference imposed on the channels is minimum in this case, that is, the channel quality evaluated in this case in the most accurate.

Specifically, according to Table 2, because the China National Sensor Network Standard only defines 15 levels of scan periods, that is, single channel scan duration, the value of n is related to the foregoing determined first scan duration for scanning the working channel and the spare channel and the single channel scan duration shown in Table 2. For example, if the foregoing determined first scan duration for scanning the working channel and the spare channel is T, it may be learned, according to Table 2, that values of integral multiples of T are respectively T, 3T, 5T, 9T, 17T, 33T, 65T, 129T, 257T, 513T, 1025T, 2049T, 4097T, 8193T and 16387T, and correspondingly, the foregoing value of n may be 1, 3, 5, 9, 17, 33, 65, 129, 257, 513, 1025, 2049, 4097, 8193 or 16387; if the foregoing determined first scan duration for scanning the working channel and the spare channel is 3T, it may be learned, according to Table 2, that values of integral multiples of 3T are respectively 3T, 9T, 33T, 129T, 513T, 2049T and 8193T, and correspondingly, the foregoing value of n may be 1, 3, 11, 43, 171, 683 or 2731; and if the first scan duration for scanning the working channel and the spare channel is 5T, it may be learned, according to Table 2, that values of integral multiples of 5T are respectively 5T, 65T and 1025T, and correspondingly, the foregoing value of n may be 1, 13 or 205.

S206: The coordinator separately averages, in an inactive period of the $n^{th}$ first superframe, the energy levels of the working channel of the n first superframes and the energy levels of the spare channel of the n first superframes, to acquire an averaged energy level of the working channel of the n first superframes and an averaged energy level of the spare channel of the n first superframes.

In this embodiment of the present invention, if the value of n is greater than 1, after the coordinator separately finishes scanning the working channel of the n first superframes and the spare channel of the n first superframes, the coordinator needs to separately average the acquired energy levels of the working channel of the n first superframes and energy levels of the spare channel of the n first superframes, to acquire the averaged energy level of the working channel of the n first superframes and the averaged energy level of the spare channel of the n first superframes.

A person of ordinary skill in the art may understand that, if the value of n is 1, the coordinator needs to scan, in an inactive period of each first superframe, the working channel of the one first superframe and the spare channel of the one first superframe according to the first scan duration, to acquire an energy level of the working channel of the one first superframe and an energy level of the spare channel of the one first superframe; and correspondingly, if the value of n is greater than 1, the coordinator needs to scan, in the inactive period of each first superframe of the n first superframes, the working channel of the first superframes and the spare channel of the first superframes according to the first scan duration, to acquire an energy level of the working channel of each first superframe and an energy level of the spare channel of each first superframe, and separately averages all the acquired energy levels of the working channel of the n first superframes and energy levels of the spare channel of the n first superframes, to acquire an averaged energy level of the working channel of the n first superframes and an averaged energy level of the spare channel of the n first superframes.

It should be noted that, the foregoing separately averaging the energy levels of the working channel of the n first superframes and the energy levels of the spare channel of the n first superframes may also be separately obtaining a sum or a variance of the energy levels of the working channel of the n first superframes and the energy levels of the spare channel of the n first superframes, or uses another method that meets a design requirement, which is not limited in the present invention.

S207: The coordinator compares, in the inactive period of the $n^{th}$ first superframe, the averaged energy level of the working channel of the n first superframes with the averaged energy level of the spare channel of the n first superframes.

After the coordinator separately averages the working channel of the n first superframes and the spare channel of the n first superframes, the coordinator compares, in the inactive period of the $n^{th}$ first superframe, the averaged energy level of the working channel of the n first superframes with the averaged energy level of the spare channel of the n first superframes.

S208: If the averaged energy level of the spare channel of the n first superframes is greater than the averaged energy level of the working channel of the n first superframes, the coordinator determines, in the inactive period of the $n^{th}$ first superframe, that the working channel of the first superframes is a working channel for sending a second superframe, and determines that a channel, in the channel queue, behind the spare channel of the first superframes is a spare channel of the second superframe.

If the averaged energy level of the spare channel of the n first superframes is greater than the averaged energy level of the working channel of the n first superframes, it indicates that the working channel of the first superframes is in idle state compared with the spare channel of the first superframes in this case, and the coordinator selects, in the inactive period of the $n^{th}$ first superframe, the working channel of the first superframes as the working channel for sending the second superframe, and selects the channel, in the channel queue, behind the spare channel of the first superframes as the spare channel of the second superframe.

Further, the determining, by the coordinator in an inactive period of the $n^{th}$ first superframe, a working channel for sending a second superframe and a spare channel of the second superframe may be understood as that: if the value of n is 1, the coordinator can determine, in an inactive period of the one first superframe, a working channel of a next superframe of the first superframe and a spare channel of the next superframe; and if the value of n is 3, the coordinator can determine, in an inactive period of the $3^{rd}$ first superframe, a working channel of next 3 superframes of the $3^{rd}$ first superframe and a spare channel of the next 3 superframes.

S209: If the averaged energy level of the spare channel of the n first superframes is less than the averaged energy level of the working channel of the n first superframes, the coordinator determines, in the inactive period of the $n^{th}$ first superframe, that the spare channel of the first superframes is the working channel for sending the second superframe, and determines that a channel, in the channel queue, behind the spare channel of the first superframes is the spare channel of the second superframe.

On the contrary, if the averaged energy level of the spare channel of the n first superframes is less than the averaged energy level of the working channel of the n first superframes, it indicates that the spare channel of the first superframes is in idle state compared with the working channel of the first superframes in this case, and the coordinator selects, in the inactive period of the $n^{th}$ first superframe, the spare channel of the first superframes as the working channel for sending the second superframe, and selects the channel, in the channel queue, behind the spare channel of the first superframes as the spare channel of the second superframe.

It should be noted that, the coordinator needs to scan, in the inactive period of each first superframe of the n first superframes, the working channel of the first superframes and the spare channel of the first superframes once, and the coordinator only needs to determine, in the inactive period of the $n^{th}$ first superframe, the working channel for sending the second superframe and the spare channel of the second superframe. For example, if the value of n is 3, the coordinator needs to scan, in an inactive period of each first superframe of 3 first superframes, the working channel of the first superframes and the spare channel of the first superframes once, and needs to determine, in an inactive period of the $3^{rd}$ first superframe, a working channel for sending the second superframe and a spare channel of the second superframe.

S210: The coordinator periodically performs S205 to S209 on a circle of the n first superframes, until the m channels in the channel queue are successively scanned and the corresponding working channel and spare channel are determined.

The coordinator periodically performs S205 to S209 on the circle of the n first superframes, that is, the coordinator scans, in the inactive period of each first superframe, the working channel of the first superframes and the spare channel of the first superframes, and determines, in the inactive period of the $n^{th}$ first superframe, the working channel for sending the second superframe and the spare channel of the second superframe according to a scan result of the working channel of the n first superframes and the spare channel of the n first superframes, until the m channels in the channel queue are successively scanned and the corresponding working channel and spare channel are determined.

Till now, the coordinator finishes a round of a dynamic scan and selection process on the m channels in the channel queue.

S211: After finishing scanning the m channels, the coordinator re-arranges the m channels according to energy levels of the m channels, to update the channel queue.

After finishing a round of scan on the m channels in the channel queue, the coordinator re-arranges the m channels according to the acquired energy levels of the m channels, to update the channel queue, that is, the m channels forms a new channel queue.

Then, referring to Table 2, the coordinator may perform a new round of scan and selection on the m channels according to the foregoing determined value of n.

If the value of n is greater than 1, a method for selecting, by the coordinator, a working channel and a spare channel may specifically be as follows:

(1) The coordinator successively scans a working channel of each first superframe of n first superframes and a spare channel of each first superframe of the n first superframes according to first scan duration, to acquire energy levels of the working channel of the n first superframes and energy levels of the spare channel of the n first superframes.

(2) The coordinator separately averages the energy levels of the working channel of the n first superframes and the energy levels of the spare channel of the n first superframes.

(3) The coordinator selects a corresponding working channel and spare channel according to an averaged energy level of the working channel of the n first superframes and an averaged energy level of the spare channel of the n first superframes.

The coordinator periodically performs (1) to (3), until the m channels in the channel queue are successively scanned and the corresponding working channel and spare channel are selected.

Further, the coordinator re-arranges the m channels again according to the energy levels of the m channels, to update the channel queue, so as to successively scan the m channels according to the first scan duration and the new channel queue and according to the energy levels of the m channels.

Specifically, if the foregoing determined first scan duration is 3T, it may be determined, according to Table 2, that values of integral multiples of 3T are successively 9T, 33T, 129T, 513T, 2049T and 8193T. Therefore, the value of n may be 3, 11, 43, 171, 683 or 2731. The coordinator may separately successively scan the working channel of each first superframe of the n first superframes and the spare channel of each first superframe according to the first scan duration, to acquire an energy level of the working channel of each first superframe and an energy level of the spare channel of each first superframe, and separately average all the acquired energy levels of the working channel of the n first superframes and energy levels of the spare channel of the n first superframes, so as to select a corresponding working channel and spare channel. For example, in the second round, if the value of n is 3, the coordinator needs to separately average energy levels of the working channel of 3 first superframes and energy levels of the spare channel of the 3 first superframes that are acquired in the 3 first superframes, and compares an averaged energy level of the working channel of the 3 first superframes with an averaged energy level of the spare channel of the 3 first superframes, so as to select a corresponding working channel and spare channel, until all the m channels are scanned and selected, that is, the second round of channel scan and selection process is finished. Similarly, the coordinator implements the channel scan and selection process of the third round, the fourth round, and so on according to the foregoing method, until the coordinator finishes the last round, that is, a channel scan and selection process when the value of n is 2731.

The coordinator circularly executes the foregoing channel selection method, that is, after the coordinator finishes scanning the m channels and selects a corresponding working channel and spare channel separately on a circle of an integral multiple of the first scan duration, the coordinator returns to execute the foregoing channel selection method again on a circle of the first scan duration, that is, the coordinator returns to S205 to continue execution, and after this, the channel selection method provided in this embodiment of the present invention is executed circularly in this manner.

Figure 5:
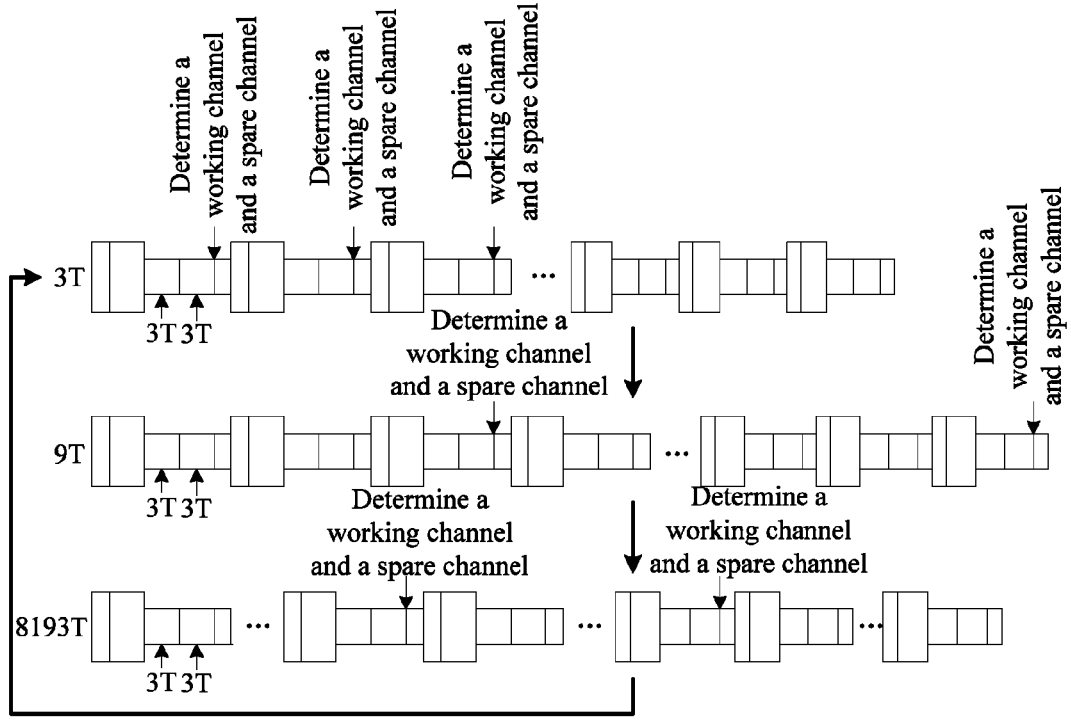
FIG. 5 is a schematic flowchart of a channel selection method according to an embodiment of the present invention.

Particularly, as shown in FIG. 5, FIG. 5 is a schematic flowchart of a channel selection method according to an embodiment of the present invention, in which first scan duration of 3T is used as an example. The method includes:

(1) A coordinator scans, in an inactive period of one first superframe, a working channel of the first superframe and a spare channel of the first superframe according to the first scan duration of 3T; and on a circle of 3T, after finishing scanning the working channel of the one first superframe and the spare channel of the one first superframe, the coordinator re-selects, in an inactive period of the first superframe, a working channel for sending a second superframe and a spare channel of the second superframe according to an acquired energy level of the working channel of the one first superframe and energy level of the spare channel of the one first superframe, until a scan and selection process of m channels is finished.

(2) The coordinator scans, in an inactive period of each first superframe of 3 first superframes, a working channel of the first superframes and a spare channel of the first superframes according to the first scan duration of 3T; on a circle of 3 periods of the first scan duration, that is, 9T, the coordinator separately averages energy levels of the working channel of the 3 first superframes and energy levels of the spare channel of the 3 first superframes that are acquired in three times in 9T; and the coordinator re-selects, in an inactive period of the $3^{rd}$ first superframe, a working channel for sending a second superframe and a spare channel of the second superframe according to an averaged energy level of the working channel of the 3 first superframes and an averaged energy level of the spare channel of the 3 first superframes, until a scan and selection process of the m channels is finished.

(3) The coordinator separately scans, in an inactive period of each first superframe of n first superframes, a working channel of the first superframes and a spare channel of the first superframes according to the first scan duration of 3T, and separately executes the foregoing scan and selection process (2) of the working channel and the spare channel on circles of 11 3 Ts, that is, 33T, 43 3 Ts, that is, 129T, . . . , 2731 3 Ts, that is, 8193T, until a scan and selection process of the m channels is finished.

(4) The coordinator circularly performs the foregoing (1) to (3).

It should be noted that, the channel selection method provided in this embodiment of the present invention can be applied to a wireless smart home system that is based on a wireless sensor network, specific implementation solutions are described above in detail, and details are not described herein again. Most smart home system networks are in an indoor environment, and there may be various wireless communications technologies. Therefore, an environment of a channel is more complicated, and a channel of a smart home system network is more vulnerable to interference. Therefore, it is very important in the smart home system to dynamically scan and adjust a working channel, that is, a communications channel, in a communication process.

This embodiment of the present invention can also be applied to a wireless medical monitoring system that is based on a wireless sensor network, specific implementation solutions are described above in detail, and details are not described herein again. The wireless medical monitoring system can monitor physical appearance information of a patient in a real-time and wireless manner, so that the patient may be free from a constraint of conventional wired monitoring, thereby implementing mobile monitoring. In addition, unpredictable channel changes and interference may also be brought. Therefore, dynamically scanning and adjusting a working channel, that is, a communications channel, in a communication process is also applicable to the wireless medical monitoring system.

This embodiment of the present invention provides a channel selection method. On one hand, because each time n first superframes are sent, a working channel and a spare channel that are selected from m channels can be scanned, and a suitable working channel of a second superframe and a spare channel of the second superframe are selected after the channels are scanned, until a process of successively scanning the m channels in a channel queue is finished, that is, dynamic scan, detection, and selection on the channels in a rotation sliding window manner are implemented, thereby ensuring that a selected working channel has relatively high communication quality; and on the other hand, because the m channels randomly selected from a preset channel page are channels that are divided and mapped in a uniform and discontinuous frequency band manner, channel scan and detection efficiency can be improved by scanning these channels.

Embodiment 3

Figure 6:
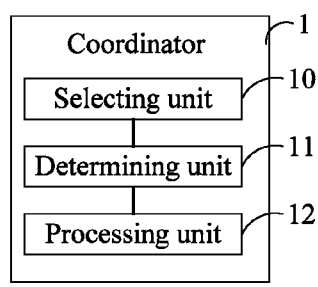
FIG. 6 is a schematic structural diagram 1 of a coordinator according to an embodiment of the present invention.

As shown in FIG. 6, this embodiment of the present invention provides a coordinator 1, which includes:

a selecting unit 10, configured to randomly select m channels from a preset channel page, where $1 \leq m \leq 16$;

a determining unit 11, configured to determine, from a channel queue consisting of the m channels, a working channel and a spare channel that meet a preset condition, where the channel queue is obtained by arranging the m channels according to channel numbers of the m channels, and the spare channel is a channel, in the channel queue, behind the working channel; and a processing unit 12, configured to scan, when n first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, where n is a positive integer, where the determining unit 11 is configured to determine, in an inactive period of the $n^{th}$ first superframe, a working channel for sending a second superframe and a spare channel of the second superframe according to the energy levels of the working channel of the n first superframes and the energy levels of the spare channel of the n first superframes.

Further, the processing unit 12 is specifically configured to successively scan the m channels according to the channel queue and according to preset second scan duration, and save an energy level of a scanned channel; and the determining unit 11 is specifically configured to: if an energy level of the $x^{th}$ channel is less than a preset energy threshold, determine that the $x^{th}$ channel is the working channel, and that the $(x+1)^{th}$ channel is the spare channel, where $1 \leq x \leq m$.

Further, the determining unit 11 is specifically configured to determine, according to duration of the inactive period of the first superframe, that both duration for scanning the working channel of the first superframe and duration for scanning the spare channel of the first superframe are the first scan duration.

Further, the processing unit 12 is specifically configured to separately average the energy levels of the working channel of the n first superframes and the energy levels of the spare channel of the n first superframes, to acquire an averaged energy level of the working channel of the n first superframes and an averaged energy level of the spare channel of the n first superframes; and compare the averaged energy level of the working channel of the n first superframes with the averaged energy level of the spare channel of the n first superframes; and the determining unit 11 is specifically configured to: if the averaged energy level of the spare channel of the n first superframes is greater than the averaged energy level of the working channel of the n first superframes, determine, in an inactive period of the $n^{th}$ first superframe, that the working channel of the first superframes is the working channel for sending the second superframe, and determine that a channel, in the channel queue, behind the spare channel of the first superframes is the spare channel of the second superframe, or if the averaged energy level of the spare channel of the n first superframes is less than the averaged energy level of the working channel of the n first superframes, determine, in an inactive period of the $n^{th}$ first superframe, the spare channel of the first superframes is the working channel for sending the second superframe, and determine that a channel, in the channel queue, behind the spare channel of the first superframes is the spare channel of the second superframe.

Further, the processing unit 12 is further configured to: after the m channels are scanned, re-arrange the m channels according to energy levels of the m channels, to update the channel queue.

Further, the processing unit 12 is specifically configured to successively scan the m channels according to the second scan duration and the channel queue and according to the channel numbers of the m channels, or successively scan the m channels according to the first scan duration and the channel queue and according to the energy levels of the m channels.

This embodiment of the present invention provides a coordinator. On one hand, because each time n first superframes are sent, a coordinator can scan a working channel and a spare channel that are selected from m channels, and select a suitable working channel of a second superframe and a spare channel of the second superframe after the channels are scanned, until a process of successively scanning the m channels in a channel queue is finished, that is, the coordinator implements dynamic scan, detection, and selection on the channels in a rotation sliding window manner, thereby ensuring that a selected working channel has relatively high communication quality; and on the other hand, because the m channels randomly selected by the coordinator from a preset channel page are channels that are divided and mapped in a uniform and discontinuous frequency band manner, the coordinator can scan these channels to improve channel scan and detection efficiency.

Embodiment 4

Figure 7:
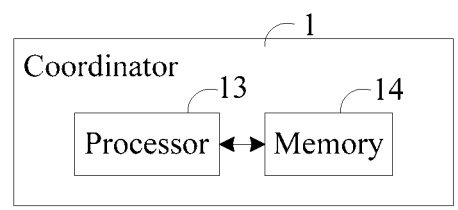
FIG. 7 is a schematic structural diagram 2 of a coordinator according to an embodiment of the present invention.

As shown in FIG. 7, this embodiment of the present invention provides a coordinator 1, which includes a processor 13 and a memory 14, where the processor 13 is a control and processing center of the coordinator 1, which runs a software program stored in the memory 14, and invokes and processes data stored in the memory 14, so as to control the coordinator 1 to implement a corresponding function; and the memory 14 may be configured to store the software program and the data, so that the processor 13 may run the software program stored in the memory 14 to implement the corresponding function of the coordinator 1.

In this embodiment of the present invention, first, the processor 13 randomly selects m channels from a preset channel page, and stores the m channels in the memory 14, where $1 \leq m \leq 16$. Then, the processor 13 determines, from a channel queue consisting of the m channels stored in the memory 14, a working channel and a spare channel that meet a preset condition, where the channel queue is obtained by arranging the m channels according to channel numbers of the m channels, and the spare channel is a channel, in the channel queue, behind the working channel. Next, the processor 13 scans, when n first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, where n is a positive integer, and stores the energy levels of the working channel of the n first superframes and the energy levels of the spare channel of the n first superframes in the memory 14. Last, the processor 13 determines, in an inactive period of the $n^{th}$ first superframe, a working channel for sending a second superframe and a spare channel of the second superframe according to the energy levels of the working channel of the n first superframes and the energy levels of the spare channel of the n first superframes that are stored in the memory 14, and stores a channel selection result in the memory 14 for later use.

Further, the processor 13 is specifically configured to successively scan the m channels according to the channel queue and according to preset second scan duration, and save an energy level of a scanned channel, and if an energy level of the $x^{th}$ channel is less than a preset energy threshold, determine that the $x^{th}$ channel is the working channel, and that the $(x+1)^{th}$ channel is the spare channel, where $1 \leq x \leq m$.

Further, the processor 13 is specifically configured to determine, according to duration of the inactive period of the first superframe, that both duration for scanning the working channel of the first superframe and duration for scanning the spare channel of the first superframe are the first scan duration.

Further, the processor 13 is specifically configured to separately average the energy levels of the working channel of the n first superframes and the energy levels of the spare channel of the n first superframes, to acquire an averaged energy level of the working channel of the n first superframes and an averaged energy level of the spare channel of the n first superframes; and compare the averaged energy level of the working channel of the n first superframes with the averaged energy level of the spare channel of the n first superframes; and if the averaged energy level of the spare channel of the n first superframes is greater than the averaged energy level of the working channel of the n first superframes, determine, in an inactive period of the $n^{th}$ first superframe, that the working channel of the first superframes is the working channel for sending the second superframe, and determine that a channel, in the channel queue, behind the spare channel of the first superframes is the spare channel of the second superframe, or if the averaged energy level of the spare channel of the n first superframes is less than the averaged energy level of the working channel of the n first superframes, determine, in an inactive period of the $n^{th}$ first superframe, the spare channel of the first superframes is the working channel for sending the second superframe, and determine that a channel, in the channel queue, behind the spare channel of the first superframes is the spare channel of the second superframe.

Further, the processor 13 is further configured to: after the m channels are scanned, re-arrange the m channels according to energy levels of the m channels, to update the channel queue.

Further, the processor 13 is specifically configured to successively scan the m channels according to the second scan duration and the channel queue and according to the channel numbers of the m channels, or successively scan the m channels according to the first scan duration and the channel queue and according to the energy levels of the m channels.

This embodiment of the present invention provides a coordinator. On one hand, because each time n first superframes are sent, a coordinator can scan a working channel and a spare channel that are selected from m channels, and select a suitable working channel of a second superframe and a spare channel of the second superframe after the channels are scanned, until a process of successively scanning the m channels in a channel queue is finished, that is, the coordinator implements dynamic scan, detection, and selection on the channels in a rotation sliding window manner, thereby ensuring that a selected working channel has relatively high communication quality; and on the other hand, because the m channels randomly selected by the coordinator from a preset channel page are channels that are divided and mapped in a uniform and discontinuous frequency band manner, the coordinator can scan these channels to improve channel scan and detection efficiency.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel selection method performed by a coordinator device in a personal area network having a plurality of devices, comprising:
  randomly selecting a number (m) of channels from a preset channel page according to a preset algorithm, wherein 1≤m≤16;
  determining, by the coordinator device, from a channel queue consisting of the m channels, a working channel and a spare channel that meet a preset condition, wherein the channel queue is obtained by arranging the m channels according to channel numbers of the m channels, and the spare channel is a channel, in the channel queue, behind the working channel;
  scanning, by the coordinator device, when a number (n) of first superframes are sent through the working channel, the working channel of the first superframes and the spare channel of the first superframes in an inactive period of each of the n first superframes according to a preset first scan duration, to acquire energy levels of the working channel of the n first superframes and energy levels of the spare channel of the n first superframes, wherein n is a positive integer; and
  determining, by the coordinator device, in an inactive period of the last one of the n first superframes, a working channel for sending a second superframe and a spare channel of the second superframe according to the energy levels of the working channel of the n first superframes and the energy levels of the spare channel of the n first superframes.

2. The channel selection method according to claim 1, wherein the determining, from the channel queue consisting of the m channels, the working channel and the spare channel that meet the preset condition comprises:
  successively scanning the m channels in the channel queue and according to preset second scan duration, and saving an energy level of a scanned channel; and
  when an energy level of an xth channel is less than a preset energy threshold, determining that the xth channel is the working channel, and that a (x+1)th channel is the spare channel, wherein 1≤x≤m.

3. The channel selection method according to claim 1, wherein before the scanning, when n first superframes are sent through the working channel, the working channel of the first superframes and the spare channel of the first superframes in the inactive period of each of the n first superframes according to the preset first scan duration, the method further comprises:
  determining, according to a duration of the inactive period of the first superframe, that both a duration for scanning the working channel of the first superframe and a duration for scanning the spare channel of the first superframe are the first scan duration.

4. The channel selection method according to claim 1, wherein the determining the working channel for sending the second superframe and the spare channel of the second superframe according to the energy levels of the working channel of the n first superframes and the energy levels of the spare channel of the n first superframes comprises:
  separately averaging the energy levels of the working channel of the n first superframes and the energy levels of the spare channel of the n first superframes, to acquire an averaged energy level of the working channel of the n first superframes and an averaged energy level of the spare channel of the n first superframes;
  comparing the averaged energy level of the working channel of the n first superframes with the averaged energy level of the spare channel of the n first superframes;
  when the averaged energy level of the spare channel of the n first superframes is greater than the averaged energy level of the working channel of the n first superframes, determining that the working channel of the first superframes is the working channel for sending the second superframe, and determining that a channel, in the channel queue, behind the spare channel of the first superframes is the spare channel of the second superframe; and
  when the averaged energy level of the spare channel of the n first superframes is less than the averaged energy level of the working channel of the n first superframes, determining that the spare channel of the first superframes is the working channel for sending the second superframe, and determining that a channel, in the channel queue, behind the spare channel of the first superframes is the spare channel of the second superframe.

5. The channel selection method according to claim 1, wherein the method further comprises:
  after the m channels are scanned, re-arranging the m channels according to energy levels of the m channels, to update the channel queue.

6. The channel selection method according to claim 5, wherein that the m channels are scanned comprises:
  successively scanning the m channels in the channel queue and according to the second scan duration and the channel numbers of the m channels, or successively scanning the m channels in the channel queue and according to the first scan duration and the energy levels of the m channels.

7. The channel selection method according to claim 1, wherein
  the channel selection method is circularly executed.

8. A coordinator device in a personal area network having a plurality of devices, the coordinator comprising:
  a processor;
  a memory; and
  a program physically stored in the memory, wherein the program comprises instructions that can be used to make the processor execute the following processes:
  randomly selecting a number (m) of channels from a preset channel page according to a preset algorithm, wherein 1≤m≤16;
  determining, from a channel queue consisting of the m channels, a working channel and a spare channel that meet a preset condition, wherein the channel queue is obtained by arranging the m channels according to channel numbers of the m channels, and the spare channel is a channel, in the channel queue, behind the working channel;
  scanning, when a number (n) of first superframes are sent through the working channel, the working channel of the first superframes and the spare channel of the first superframes in an inactive period of each of the n first superframes according to preset first scan duration, to acquire energy levels of the working channel of the n first superframes and energy levels of the spare channel of the n first superframes, wherein n is a positive integer; and determining, in an inactive period of the last one of the n first superframes, a working channel for sending a second superframe and a spare channel of the second superframe according to the energy levels of the working channel of the n first superframes and the energy levels of the spare channel of the n first superframes.

9. The coordinator according to claim 8, wherein the determining, from the channel queue consisting of the m channels, the working channel and the spare channel that meet the preset condition comprises:
successively scanning the m channels in the channel queue and according to a preset second scan duration, and saving an energy level of a scanned channel; and
when an energy level of the xth channel is less than a preset energy threshold, determining that the xth channel is the working channel, and that the (x+1)th channel is the spare channel, wherein 1≤x≤m.

10. The coordinator according to claim 8, wherein before the scanning, when n first superframes are sent through the working channel, the working channel of the first superframes and the spare channel of the first superframes in the inactive period of each of the n first superframes according to the preset first scan duration, the processes further comprises:
determining, according to a duration of the inactive period of the first superframe, that both a duration for scanning the working channel of the first superframe and a duration for scanning the spare channel of the first superframe are the first scan duration.

11. The coordinator according to claim 8, wherein the determining the working channel for sending the second superframe and the spare channel of the second superframe according to the energy levels of the working channel of the n first superframes and the energy levels of the spare channel of the n first superframes comprises:
separately averaging the energy levels of the working channel of the n first superframes and the energy levels of the spare channel of the n first superframes, to acquire an averaged energy level of the working channel of the n first superframes and an averaged energy level of the spare channel of the n first superframes;
comparing the averaged energy level of the working channel of the n first superframes with the averaged energy level of the spare channel of the n first superframes;
when the averaged energy level of the spare channel of the n first superframes is greater than the averaged energy level of the working channel of the n first superframes, determining that the working channel of the first superframes is the working channel for sending the second superframe, and determining that a channel, in the channel queue, behind the spare channel of the first superframes is the spare channel of the second superframe; and
when the averaged energy level of the spare channel of the n first superframes is less than the averaged energy level of the working channel of the n first superframes, determining that the spare channel of the first superframes is the working channel for sending the second superframe, and determining that a channel, in the channel queue, behind the spare channel of the first superframes is the spare channel of the second superframe.

12. The coordinator according to claim 8, wherein the processes further comprises:
after the m channels are scanned, re-arranging the m channels according to energy levels of the m channels, to update the channel queue.

13. The coordinator according to claim 12, wherein that the m channels are scanned comprises:
successively scanning the m channels in the channel queue and according to the second scan duration and the channel numbers of the m channels, or successively scanning the m channels in the channel queue and according to the first scan duration and the energy levels of the m channels.

14. The coordinator according to claim 8, wherein the program comprises instructions that can be used to make the processor execute the processes circularly.

* * * * *

UNITED STATES PATENT AND TRADEMARK OFFICE
CERTIFICATE OF CORRECTION

PATENT NO. : 9,510,325 B2  
APPLICATION NO. : 14/874072  
DATED : November 29, 2016  
INVENTOR(S) : Liu et al.

Page 1 of 1

It is certified that error appears in the above-identified patent and that said Letters Patent is hereby corrected as shown below:

On the Title Page

Item (73), "Huawei Technologies Co., Ltd., Shenzhen (CN)" should read:  
-- Huawei Technologies Co., Ltd., Shenzhen (CN)  
Beijing University of Posts and Telecommunications, Beijing (CN) --.

Signed and Sealed this  
Twenty-eighth Day of August, 2018

Andrei Iancu  
*Director of the United States Patent and Trademark Office*